US011689401B2

(12) United States Patent
Lee

(10) Patent No.: US 11,689,401 B2
(45) Date of Patent: Jun. 27, 2023

(54) V2X COMMUNICATION METHOD OF TERMINAL IN WIRELESS COMMUNICATION SYSTEM, AND TERMINAL USING METHOD

(71) Applicant: LG ELECTRONICS INC., Seoul (KR)

(72) Inventor: Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 859 days.

(21) Appl. No.: 16/497,414

(22) PCT Filed: Mar. 26, 2018

(86) PCT No.: PCT/KR2018/003557
§ 371 (c)(1),
(2) Date: Sep. 24, 2019

(87) PCT Pub. No.: WO2018/182263
PCT Pub. Date: Oct. 4, 2018

(65) Prior Publication Data
US 2020/0107351 A1 Apr. 2, 2020

Related U.S. Application Data

(60) Provisional application No. 62/476,728, filed on Mar. 25, 2017.

(51) Int. Cl.
*H04L 27/26* (2006.01)
*H04W 4/40* (2018.01)
(Continued)

(52) U.S. Cl.
CPC .......... *H04L 27/2602* (2013.01); *H04W 4/40* (2018.02); *H04W 28/0289* (2013.01); *H04W 72/0446* (2013.01); *H04W 72/23* (2023.01)

(58) Field of Classification Search
None
See application file for complete search history.

(56) References Cited

U.S. PATENT DOCUMENTS 10,856,176 B2 * 12/2020 Lee .................. H04W 72/20
11,076,315 B2 *  7/2021 Lee .................. H04L 47/11
(Continued)

FOREIGN PATENT DOCUMENTS

EP        2632077       8/2013
JP     2015136065       7/2015
(Continued)

OTHER PUBLICATIONS

PCT International Application No. PCT/KR2018/003557, International Search Report dated Jun. 20, 2018, 4 pages.
(Continued)

*Primary Examiner* — Christopher T Wyllie
(74) *Attorney, Agent, or Firm* — Lee Hong Degerman Kang Waimey

(57) ABSTRACT

Provided are a V2X communication method of a terminal in a wireless communication system and a terminal using the method. The method is characterized by: receiving at least one DCI of a first DCI based on a first TTI and a second DCI based on a second TTI, from a base station through a PDCCH; and, based on the at least one DCI, performing V2X communication by using one of the methods of transmission based on the first TTI and transmission based on the second TTI, wherein the first TTI is shorter than the second TTI, a first RNTI configured for the first DCI is different from a second RNTI configured for the second DCI, and which one between the first TTI-based transmission and the second TTI-based transmission is accepted is determined based on one of the first RNTI and the second RNTI.

14 Claims, 16 Drawing Sheets

(51) Int. Cl.
  *H04W 28/02* (2009.01)
  *H04W 72/0446* (2023.01)
  *H04W 72/23* (2023.01)

(56) References Cited

U.S. PATENT DOCUMENTS

| | | | | |
|---|---|---|---|---|
| 2018/0084545 A1* | 3/2018 | Hosseini | ............... | H04L 5/0053 |
| 2018/0220323 A1* | 8/2018 | Chen | ..................... | H04L 5/0037 |
| 2018/0234998 A1* | 8/2018 | You | ....................... | H04W 72/23 |
| 2018/0270880 A1* | 9/2018 | Hosseini | ............... | H04L 1/0003 |
| 2019/0238257 A1* | 8/2019 | Hosseini | ............... | H04L 1/0016 |
| 2019/0261216 A1* | 8/2019 | Lee | .................. | H04W 28/0289 |
| 2021/0022035 A1* | 1/2021 | Lee | ......................... | H04L 47/11 |

FOREIGN PATENT DOCUMENTS

| | | | |
|---|---|---|---|
| JP | 2017034694 | | 2/2017 |
| KR | 20130139684 A | * | 12/2013 |
| WO | 2016143968 | | 9/2016 |
| WO | 2016159730 | | 10/2016 |
| WO | 2016200236 | | 12/2016 |
| WO | 2017018758 | | 2/2017 |
| WO | 2017035300 | | 3/2017 |
| WO | 2017048109 | | 3/2017 |

OTHER PUBLICATIONS

Huawei, et al., "Discussion on sTTI scheduling", 3GPP TSG RAN WG1 Meeting #88, R1-1701733, Feb. 2017, 10 pages.
ZTE, et al., "Discussion on DCI format of V2X SPS scheduling", 3GPP TSG RAN WG1 Meeting #88, R1-1701620, Feb. 2017, 6 pages.
Japan Patent Office Application No. 2019-552520, Office Action dated Mar. 2, 2021, 5 pages.
Japan Patent Office Application Serial No. 2019-552520, Office Action dated Nov. 10, 2020, 44 pages.
European Patent Office Application Serial No. 18776850.2, Search Report dated Feb. 5, 2020, 10 pages.
Korean Intellectual Property Office Application No. 10-2019-7024108, Notice of Allowance dated Dec. 28, 2020, 2 pages.
Ericsson, "Short TTI Transmission for PC5-based V2X," 3GPP TSG-RAN WG1 Meeting #88bis, R1-1705786, Apr. 2017, 5 pages.
CATT, "Discussion on V2X SPS resource usage," 3GPP TSG-RAN WG2 Meeting #97, R2-1701247, Feb. 2017, 3 pages.
The State Intellectual Property Office of the People's Republic of China Application Serial No. 201880020616.1, Office Action dated Sep. 19, 2022, 6 pages.
Intel Corporation, "DCI formats for shorten TTI", R1-1611946, 3GPP TSG-RAN WG1 #87, Nov. 2016, 5 pages.

* cited by examiner

V2X COMMUNICATION METHOD OF TERMINAL IN WIRELESS COMMUNICATION SYSTEM, AND TERMINAL USING METHOD

CROSS-REFERENCE TO RELATED APPLICATIONS

This application is the National Stage filing under 35 U.S.C. 371 of International Application No. PCT/KR2018/003557, filed on Mar. 26, 2018, which claims the benefit of U.S. Provisional Application No. 62/476,728, filed on Mar. 25, 2017, the contents of which are all hereby incorporated by reference herein in their entirety.

BACKGROUND ART

Field of the Disclosure

The disclosure relates to wireless communication and, more particularly, to a V2X communication method of a terminal in a wireless communication system and a terminal using the method.

Related Art

The International Telecommunication Union Radio communication sector (ITU-R) is working on the standardization of International Mobile Telecommunication (IMT)-Advanced, the next generation of mobile communication systems after the third generation. IMT-Advanced aims to support Internet Protocol (IP)-based multimedia services at data rates of 1 Gbps in stationary and slow motions and 100 Mbps in high speeds.

3rd Generation Partnership Project (3GPP) is preparing LTE-Advanced (LTE-A), which is an improvement of Long Term Evolution (LTE) based on Orthogonal Frequency Division Multiple Access (OFDMA)/Single Carrier-Frequency Division Multiple Access (SC-FDMA) transmission scheme, as a system standard that meets the requirements of IMT-Advanced. LTE-A is one of the potential candidates for IMT-Advanced.

Recently, interest in Device-to-Device (D2D) technology for direct communication between devices is increasing. In particular, D2D is drawing attention as a communication technology for a public safety network. Commercial communication networks are rapidly changing to LTE, but current public safety networks are mainly based on 2G technology in terms of cost and conflict with existing communication standards. This gap in technology and the need for improved services have led to efforts to improve public safety networks.

The above-described D2D communication can be extended and applied to signal transmission and reception between vehicles, and communication related to a vehicle is specifically called V2X (vehicle-to-everything) communication. In V2X, the term "X" may mean PEDESTRIAN (communication between a vehicle and a device carried by an individual (e.g., handheld terminal carried by a pedestrian, cyclist, driver or passenger), and at this time, V2X may also be called V2P), VEHICLE (communication between vehicles) (V2V), INFRASTRUCTURE/NETWORK (communication between a vehicle and a roadside unit (RSU)/network; e.g., RSU is a transportation infrastructure entity; e.g., An entity transmitting speed notifications) implemented in an eNB or a stationary UE)) (V2I/N), etc. A device (related with V2P communication) possessed by a pedestrian (or person) is named "P-UE", and a device installed in a vehicle is named "V-UE". In the present disclosure, the term "entity" may be interpreted as at least one of P-UE, V-UE, and RSU (/NETWORK/INFRASTRUCTURE).

In a next-generation V2X communication system, a V2X communication method based on a short transmission time interval (S-TTI or s-TTI), which is short than 1 millisecond (ms), is taken into consideration in order to reduce packet data latency. Here, since an S-TTI may have a smaller number of symbols than an existing TTI, when V2X communication based on an S-TTI is performed, a problem may arise in a PSCCH interpretation method, field configuration, payload size setting, and the like based on an S-TTI.

Therefore, the disclosure proposes a V2X communication method based on efficient control and interpretation of a PSSCH in response to the introduction of an S-TTI.

SUMMARY

An aspect of the disclosure is to provide a V2X communication method of a terminal in a wireless communication system and a terminal using the method.

In one aspect, a vehicle-to-everything (V2X) communication method of a user equipment (UE) in a wireless communication system is provided. The method comprises receiving at least one piece of downlink control information (DCI) of first DCI based on a first transmission time interval (TTI) and second DCI based on a second TTI from a base station through a physical downlink control channel (PDCCH) and performing V2X communication using one method of transmission based on the first TTI and transmission based on the second TTI on the basis of the at least one piece of DCI, wherein the first TTI is shorter than the second TTI, a first radio network temporary identifier (RNTI) set for the first DCI is different from a second RNTI set for the second DCI, and it is determined which of the transmission based on the first TTI and the transmission based on the second TTI is allowed on the basis of one of the first RNTI and the second RNTI.

Each of the first DCI and the second DCI may be DCI for dynamic scheduling or semi-persistent scheduling.

A size of the first DCI may be the same as a size of the second DCI.

The first DCI may comprise a flag for distinguishing the first DCI and the second DCI.

When the first DCI is received, determination of time to perform initial transmission or a sidelink index field may be interpreted on the basis of the second TTI.

User equipment assistance information about the transmission based on the first TTI may be independently reported.

When performing the V2X communication, scheduling for the V2X communication based on the first TTI may be performed by each subchannel group, and the subchannel group may be a set of a predefined number of subchannels comprised in a V2X resource pool.

The scheduling may be performed when a field configuration of a physical sidelink control channel (PSCCH) based on the first TTI and a number of resource blocks comprised in the PSCCH based on the first TTI are set to be the same those of a PSCCH based on the second TTI.

When both the transmission based on the first TTI and the transmission based on the second TTI are allowed in a V2X resource pool, a physical sidelink shared channel (PSSCH) based on the first TTI may comprise a field indicating the transmission based on the first TTI.

When performing the V2X communication, a field indicating a time interval between initial transmission and retransmission of the PSCCH may be interpreted on the basis of the second TTI.

When only the transmission based on the first TTI is allowed in a V2X resource pool, if performing the V2X communication, a field indicating a time interval between initial transmission and retransmission of a PSCCH may be interpreted on the basis of the first TTI.

The first DCI may comprise a field indicating a transmission period allowed in a V2X pool and a number of aggregated first TTIs capable of the transmission based on the first TTI.

When performing the V2X communication, resource exclusion may be performed on the basis of the field indicating the transmission period allowed in the V2X pool and the number of aggregated first TTIs capable of the transmission based on the first TTI.

When a size of the PSCCH based on the first TTI is greater than a size of the PSSCH based on the first TTI, a PSCCH based on the first TTI may comprise an indicator indicating an index of a first TTI used for transmitting the PSSCH among a plurality of first TTIs corresponding to a PSCCH transmission interval.

An allowable range of the transmission based on the first TTI may be set differently for each congestion level.

In another aspect, provided is a user equipment (UE) comprising a transceiver configured to transmit and receive a radio signal and a processor configured to be connected with the transceiver and to operate, wherein the processor is configured to receive at least one piece of downlink control information (DCI) of first DCI based on a first transmission time interval (TTI) and second DCI based on a second TTI from a base station through a physical downlink control channel (PDCCH) and perform V2X communication using one method of transmission based on the first TTI and transmission based on the second TTI on the basis of the at least one piece of DCI, wherein the first TTI is shorter than the second TTI, a first radio network temporary identifier (RNTI) set for the first DCI is different from a second RNTI set for the second DCI, and it is determined which of the transmission based on the first TTI and the transmission based on the second TTI is allowed on the basis of one of the first RNTI and the second RNTI.

According to the disclosure, when S-TTI-based V2X communication is performed with the introduction of an S-TTI, a V2X communication method based on the adjustment of a PSCCH payload size and the efficient configuration and interpretation of a PSCCH field is provided, thereby securing seamless V2X communication of a UE in the coexistence of S-TTI-based V2X communication and L-TTI-based V2X communication due to the introduction of an S-TTI.

DESCRIPTION OF EXEMPLARY EMBODIMENTS

Figure 1:
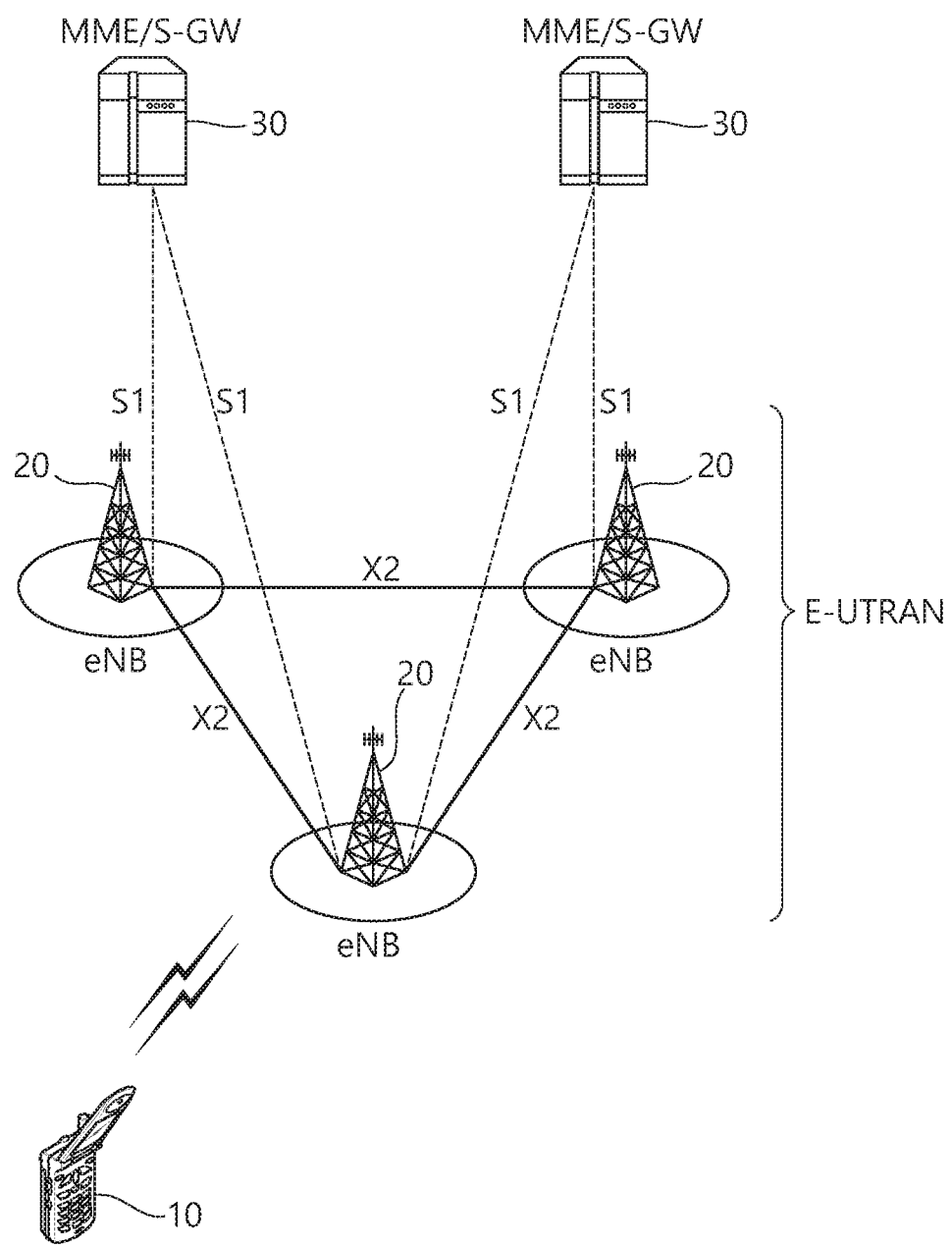
FIG. 1 shows a wireless communication system.

FIG. 1 shows a wireless communication system. The wireless communication system may be referred to as an Evolved-UMTS Terrestrial Radio Access Network (E-UTRAN) or a Long Term Evolution (LTE)/LTE-A system, for example.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
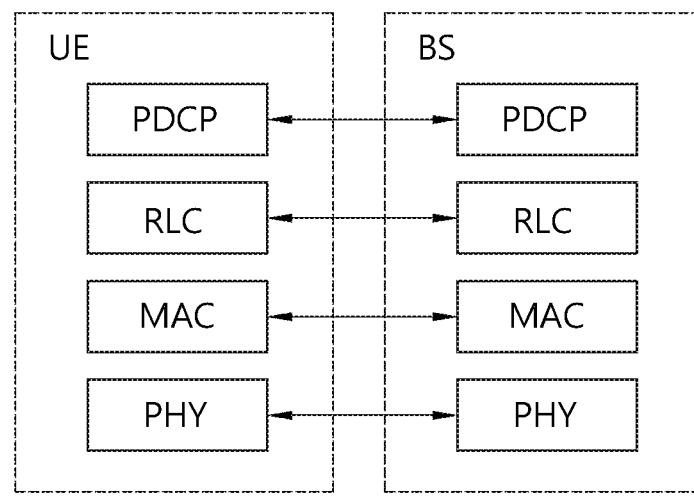
FIG. 2 is a diagram showing a wireless protocol architecture for a user plane.
Figure 3:
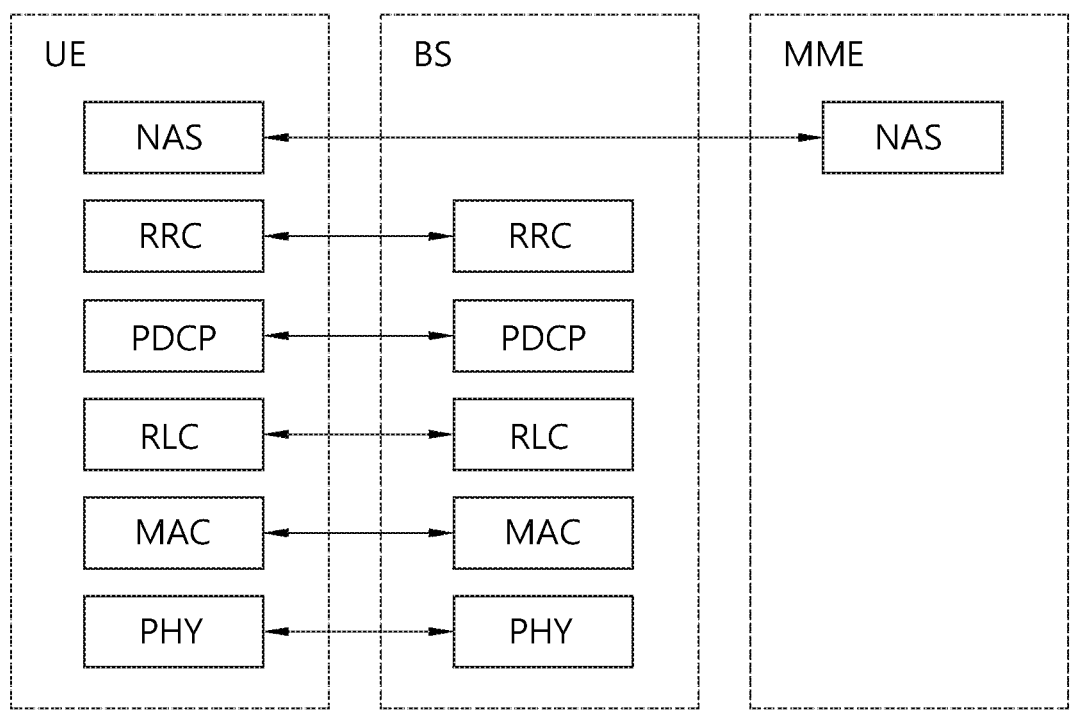
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel A Transmission Time Interval (TTI) is a unit time for subframe transmission.

In what follows, a new radio access technology (RAT) will be described. The new radio access technology may also be called a new radio for short.

As more and more communication devices require a larger communication capacity, needs for improved mobile broadband communication over conventional radio access technologies (RATs) are emerging. Also, massive Machine Type Communication (MTC) which connects a plurality of devices and objects to each other and provides various services anytime and anywhere is also one of important issues that need to be considered in the next-generation communication. In addition, a new communication system design is under consideration, which takes into account services or terminals sensitive to reliability and latency; adoption of the next-generation radio access technology which supports enhanced mobile broadband communication, massive MTC, Ultra-Reliable and Low Latency Communication (URLLC), and so on is under consideration, which, for the purpose of convenience, is referred to as a new RAT or new radio (NR) in the present disclosure.

Figure 4:
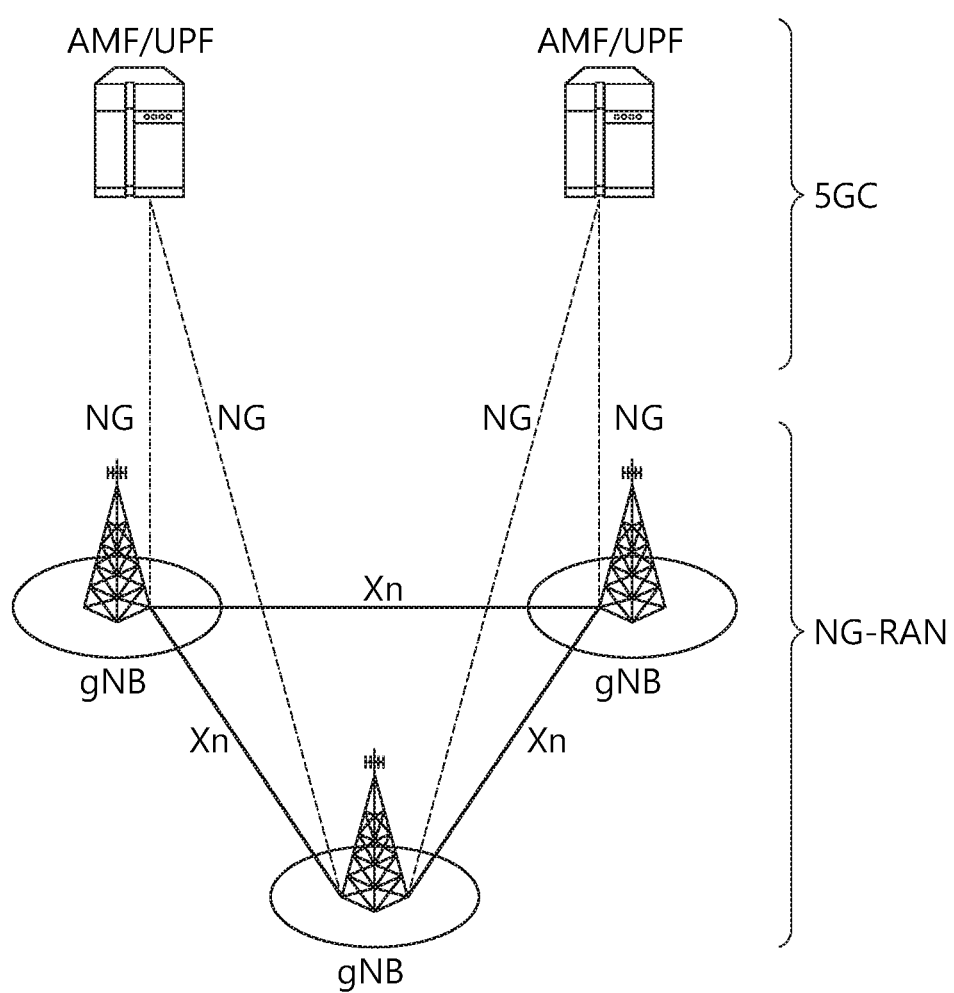
FIG. 4 illustrates a system structure of a new generation radio access network (NG-RAN) to which NR is applied.

FIG. 4 illustrates a system structure of a new generation radio access network (NG-RAN) to which NR is applied.

Referring to FIG. 4, NG-RAN may include a gNB and/or eNB which provides a UE with the user plane and control plane protocol termination. FIG. 4 illustrates the case where only the gNB is included. The gNB and the eNB are connected to each other through the Xn interface. The gNB and the eNB are connected to the 5G core network (5GC) through the NG interface. More specifically, the gNB and the eNB are connected to the access and mobility management function (AMF) through the NG-C interface and to the user plane function (UPF) through the NG-U interface.

Figure 5:
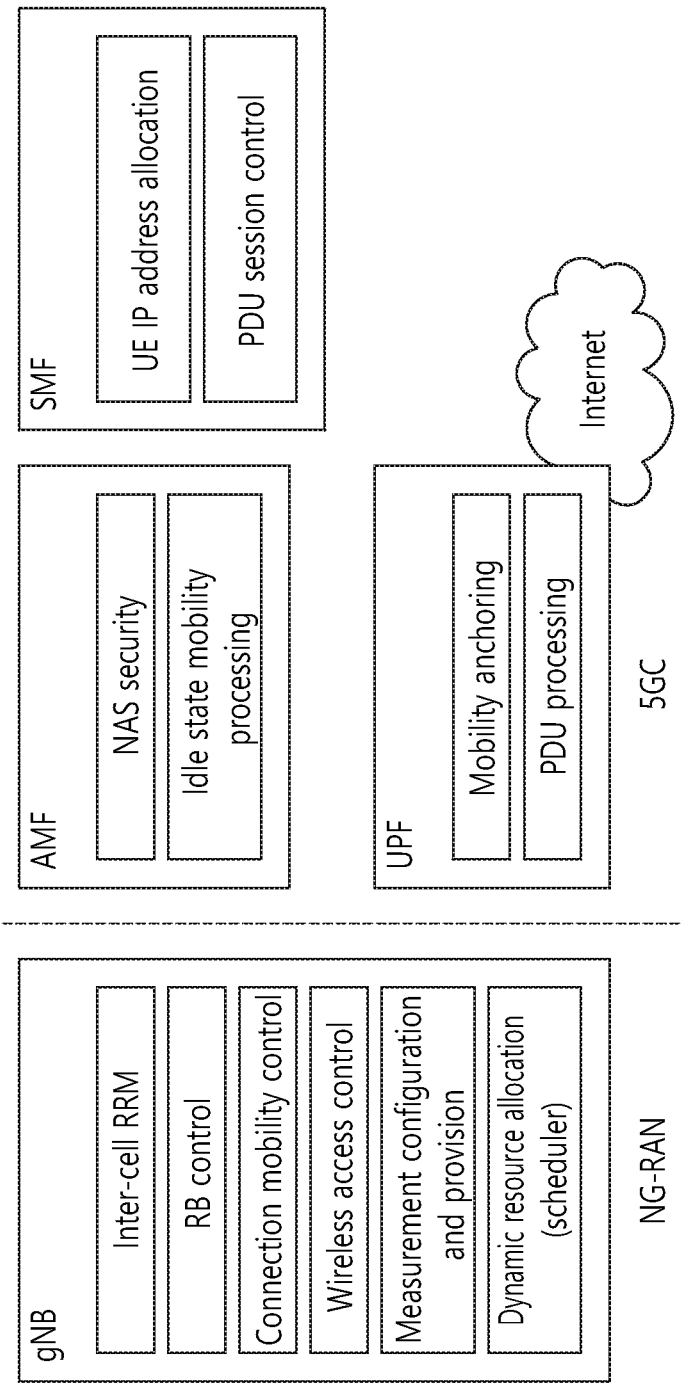
FIG. 5 illustrates a functional division between the NG-RAN and the 5GC.

FIG. 5 illustrates a functional division between the NG-RAN and the 5GC.

Referring to FIG. 5, the gNB may provide functions such as inter-cell radio resource management (RRM), radio bearer (RB) management, connection mobility control, radio admission control, measurement configuration & provision, and dynamic resource allocation. The AMF may provide such functions as NAS security and idle state mobility processing. The UPF may provide such functions as mobility anchoring and PDU processing. The Session Management Function (SMF) may provide functions such as allocation of UE IP address and PDU session control.

Figure 6:
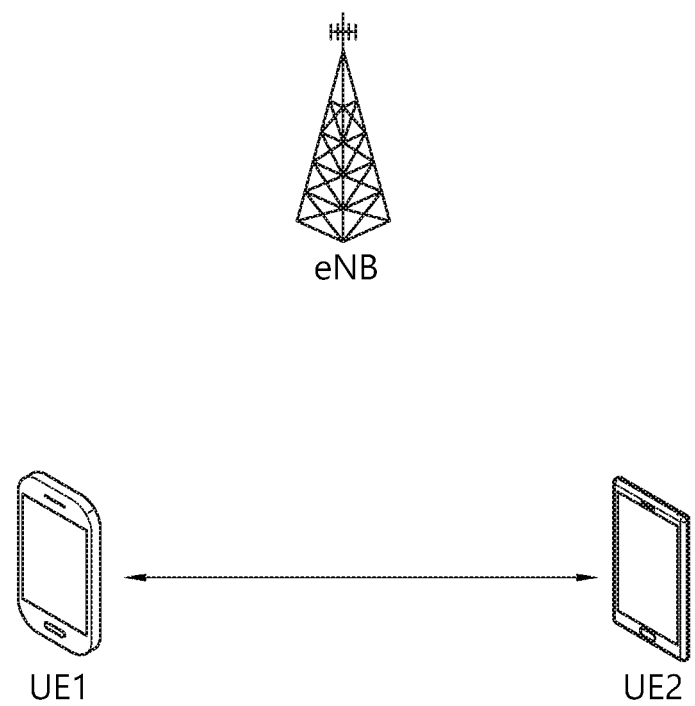
FIG. 6 illustrates UEs performing V2X or D2D communication.

FIG. 6 illustrates UEs performing V2X or D2D communication.

Referring to FIG. 6, in the V2X/D2D communication, the term UE primarily refers to a user terminal. However, when a network device such as an eNB transmits and receives a signal according to a communication scheme employed for UEs, the eNB may also be regarded as a kind of terminal.

UE 1 may operate to select a resource unit corresponding to a specific resource within a resource pool which is a set of series of resources and to transmit a D2D signal by using the corresponding resource unit. UE 2, which is a UE receiving the D2D signal, may be configured for a resource pool to which the UE 1 may transmit a signal and detect the signal transmitted from the UE 1 within the corresponding resource pool.

At this time, if the UE 1 is within coverage of an eNB, the eNB may inform the UE 1 of the resource pool. On the other hand, if the UE 1 lies outside the coverage of the eNB, other UE may inform the UE 1 of the resource pool, or a predetermined resource may be utilized.

In general, a resource pool consists of a plurality of resource units, and each UE may select one or more resource units to transmit its D2D signal.

Figure 7:
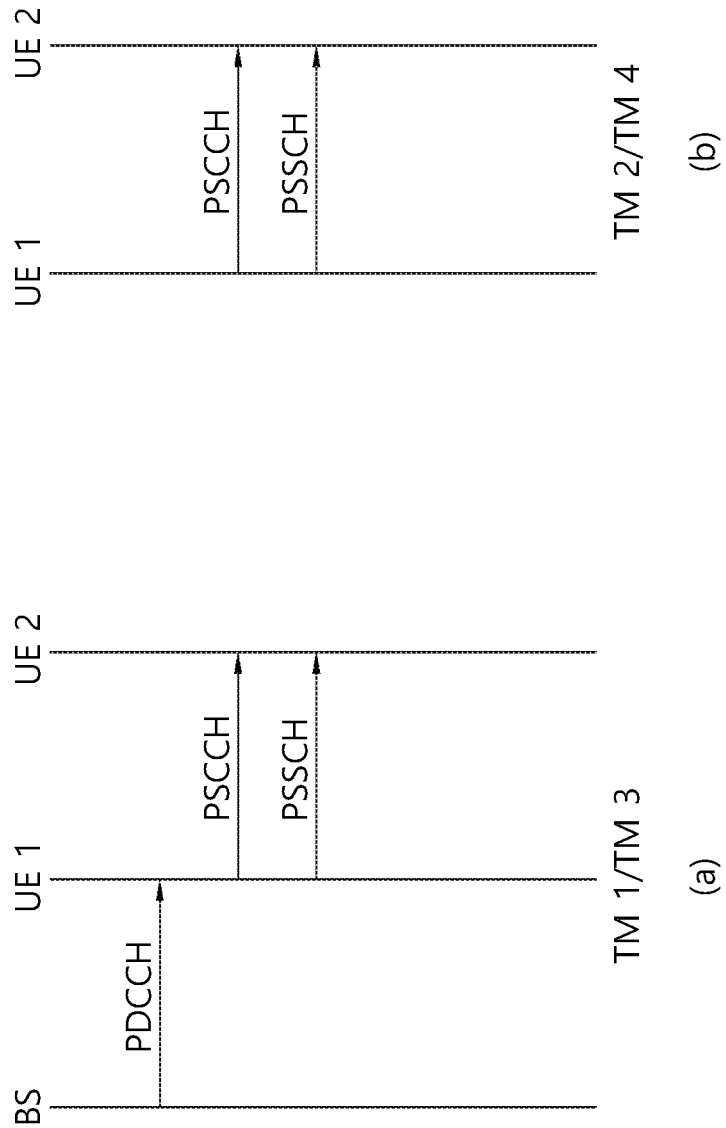
FIG. 7 illustrates a UE operation according to the transmission mode (TM) related to V2X/D2D communication.

FIG. 7 illustrates a UE operation according to the transmission mode (TM) related to V2X/D2D communication.

FIG. 7(*a*) is related to transmission mode 1, 3 while FIG. 7(*b*) is related to transmission mode 2, 4. In the transmission mode 1, 3, an eNB performs resource scheduling for UE 1 through PDCCH (more specifically, DCI), and the UE 1 performs D2D/V2X communication with UE 2 according to the corresponding resource scheduling. After transmitting Sidelink Control Information (SCI) to the UE 2 through a Physical Sidelink Control Channel (PSCCH), the UE 1 may transmit data based on the SCI through a Physical Sidelink Shared Channel (PSSCH). The transmission mode 1 may be applied to D2D communication while the transmission mode 3 may be applied to V2X communication.

The transmission mode 2, 4 may be referred to as a mode in which a UE performs scheduling autonomously. More specifically, the transmission mode 2 may be applied to D2D communication, and a UE may select a resource by itself within a set resource pool to perform a D2D operation. The transmission mode 4 may be applied to V2X communication, and a UE may select a resource by itself within a selection window through a process such as sensing/SA decoding, after which the UE may perform a V2X operation. After transmitting SCI to the UE 2 through the PSCCH, the UE 1 may transmit data based on the SCI through the PSSCH. In what follows, the transmission mode may be referred to as a mode.

While the control information transmitted by an eNB to a UE through the PDCCH is called downlink control information (DCI), the control information transmitted by a UE to other UEs through the PSCCH may be called SCI. The SCI may be expressed in various formats, for example, SCI format 0 and SCI format 1.

The SCI format 0 may be used for scheduling of the PSSCH. The SCI format 0 may include a frequency hopping flag (1 bit), resource block allocation and hopping resource allocation field (the number of bits of which may differ depending on the number of resource blocks of a sidelink), time resource pattern (7 bit), modulation and coding scheme (MCS) (5 bit), time advance indication (11 bit), and group destination ID (8 bit).

The SCI format 1 may be used for scheduling of the PSSCH. The SCI format 1 may include priority (3 bit), resource reservation (4 bit), frequency resource position of initial transmission and retransmission (the number of bits of which may differ depending on the number of sub-channels of a sidelink), time gap between initial transmission and retransmission (4 bit), MCS (5 bit), retransmission index (1 bit), and reserved information bit. In what follows, the reserved information bit may be called a reserved bit for short. Reserved bits may be added until the bit size of the SCI format 1 becomes 32 bit. In other words, the SCI format 1 includes a plurality of fields, each of which has different information from each other, where the number of remaining bits excluding the total number of bits of the plurality of fields from the total number of fixed bits (32 bit) of the SCI format 1 may be called reserved bits.

The SCI format 0 may be used for the transmission mode 1, 2 while the SCI format 1 may be used for the transmission mode 3, 4.

Figure 8:
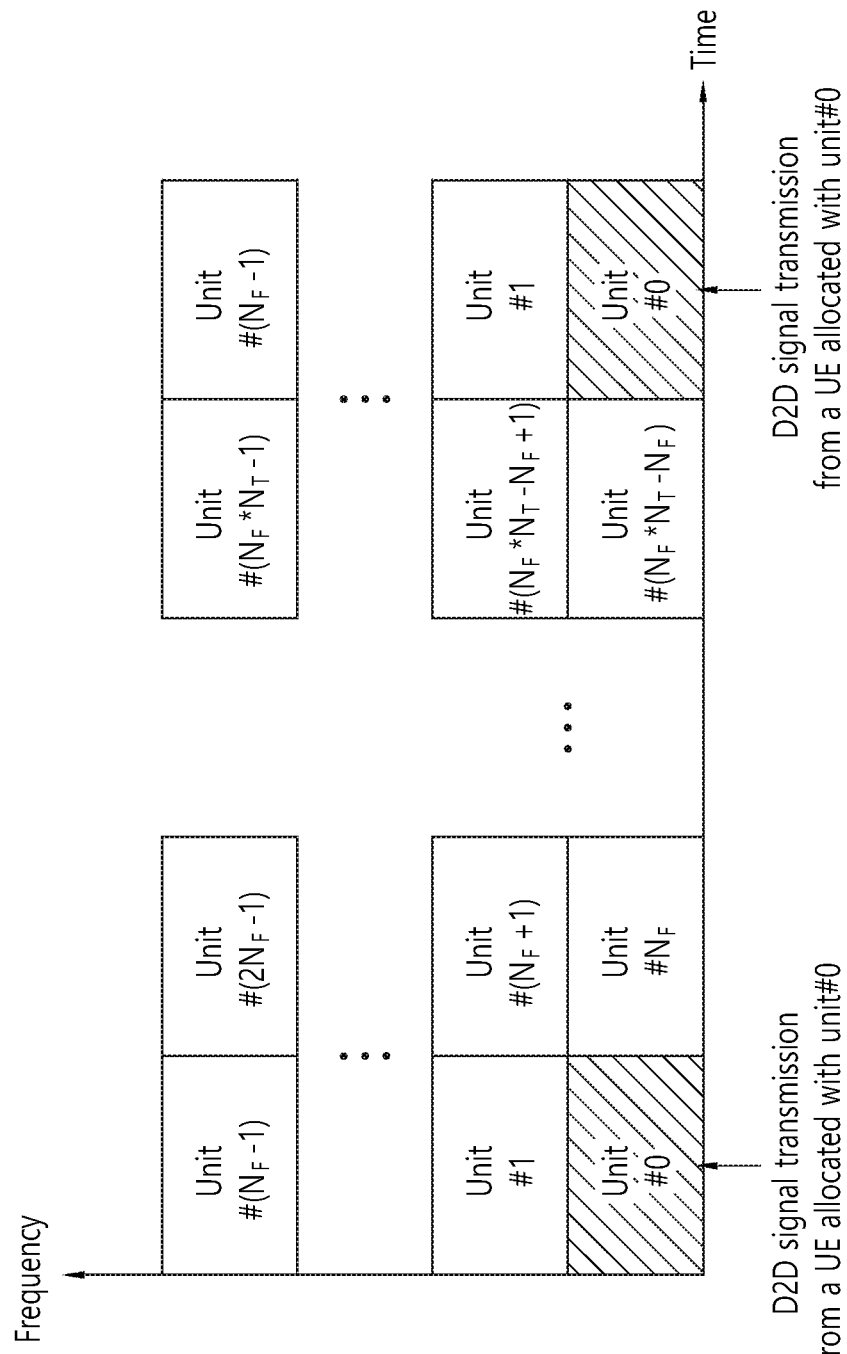
FIG. 8 illustrates an example of a configuration of resource units.

FIG. 8 illustrates an example of a configuration of resource units.

Referring to FIG. 8, the entire frequency resources of a resource pool may be divided into $N_F$ units, and the entire time resources of the resource pool may be divided into $N_T$ units, by which a total of $N_F \times N_T$ resource units may be defined within the resource pool.

At this time, it is assumed that the corresponding resource pool is repeated with a period of $N_T$ subframes.

As shown in FIG. 8, one resource unit (for example, Unit #0) may appear repeatedly at regular intervals. Similarly, to obtain a diversity effect in the time or frequency dimension, the index of a physical resource unit to which one logical resource unit is mapped may vary according to a predetermined pattern as time elapses. In the aforementioned resource unit structure, a resource pool may indicate a set of resource units available for transmission, which may be used by a UE attempting to transmit a D2D signal.

A resource pool may be subdivided into various types. For example, the resource pool may be classified according to the content of a D2D signal transmitted from each resource pool. Each resource pool may be classified as follows, where each resource pool may transmit a D2D signal of which the content is described below.

1) Scheduling Assignment (SA) resource pool or D2D (sidelink) control channel: A resource pool by which each transmitting UE transmits a signal including information about the resource position of a D2D data channel transmitted from a succeeding or the same subframe and information required for demodulation of the other data channels (for example, information about modulation and coding scheme (MCS), MIMO transmission scheme, and timing advance).

The signal described in 1) may be transmitted together with D2D data after being multiplexed on the same resource unit. In this case, an SA resource pool may indicate a resource pool to which SA is transmitted by being multiplexed with D2D data. The SA resource pool may also be called a D2D (sidelink) control channel.

2) D2D data channel: A resource pool by which a transmitting UE transmits user data by using a resource designated through SA. If it is possible that D2D data and SA information are multiplexed and transmitted together on the same resource unit, a resource pool for a D2D data channel may transmit only the D2D data channel in such a way to exclude the SA information. In other words, the D2D data channel resource pool still uses the resource element which has been used for transmitting SA information on the basis of individual resource units within the SA resource pool.

3) Discovery channel: A resource pool for messages by which a transmitting UE transmits information such as its identity (ID) so that a neighboring UE may discover the transmitting UE.

Even if a D2D signal carries the same content as described above, a different resource pool may be utilized depending on the transmission and reception attributes of the D2D signal. As one example, even if the same D2D data channel or the same discovery message is transmitted, the resource pool may be further classified into another different resource pool depending on a scheme for determining transmission timing of the D2D signal (for example, whether the D2D signal is transmitted at the time of receiving a synchronization reference signal or transmitted after a predetermined timing advance is applied at the time of receiving the synchronization reference signal), resource allocation scheme (for example, whether a transmission resource of an individual signal is allocated by an eNB for each individual transmitting UE or whether an individual transmitting UE selects an individual signal transmission resource by itself within the resource pool), signal format (for example, the number of symbols occupied by each D2D signal in one subframe or the number of subframes used for transmission of one D2D signal), strength of a signal from the eNB, or transmission power intensity of a D2D UE).

As described above, the method in D2D communication for indicating a transmission resource of a D2D transmitting UE directly by the eNB may be called a mode 1 while the method for selecting a transmission resource directly by the UE, where a transmission resource region is predetermined or the eNB designates the transmission resource region, may be called a mode 2.

In the case of D2D discovery, the case where the eNB directly indicates a resource may be referred to as type 2 while the case where the UE directly selects a transmission resource from a predetermined resource region or a resource region indicated by the eNB may be referred to as type 1.

Meanwhile, the D2D may also be called sidelink. The SA may also be called a physical sidelink control channel (PSCCH), and D2D synchronization signal may also be called a sidelink synchronization signal (SSS). A control channel which transmits the most basic information before initiation of D2D communication is referred to as a physical sidelink broadcast channel (PSBCH), where the PSBCH may be transmitted together with an SSS and may alternatively called a physical D2D synchronization channel (PD2DSCH). A signal notifying that a specific UE is located in the vicinity may include an ID of the specific UE, and a channel to which such a signal is transmitted may be called a physical sidelink discovery channel (PSDCH).

In the D2D communication, only the D2D communication UE transmits a PSBCH together with an SSS, and in this reason, measurement of an SSS has been performed by using a demodulation reference signal (DM-RS) of the PSBCH. A UE in the out-coverage area may measure the DM-RS of the PSBCH and measure reference signal received power (RSRP) of the signal to determine whether the UE itself operate as a synchronization source.

Hereinafter, the sidelink RSSI (Sidelink Received Signal Strength Indicator; S-RSSI), PSSCH Reference Signal Received Power (PSSCH-RSRP), Channel Busy Rate (CHANNEL BUSY RATIO; CBR), Channel Occupancy Rate (CHANNEL OCCUPANCY RATIO (CR) will be described.

<S-RSSI>

Sidelink RSSI (S-RSSI) may be defined as the linear average of the total received power (in [W]) per SC-FDMA symbol observed by the UE only in the configured sub-channel in SC-FDMA symbols 1, 2, . . . , 6 of the first slot and SC-FDMA symbols 0, 1, . . . , 5 of the second slot of a subframe.

Herein, the reference point for the S-RSSI may be the antenna connector of the UE.

If receiver diversity is in use by the UE, the reported value may not be lower than the corresponding S-RSSI of any of the individual diversity branches.

S-RSSI is applicable for RRC_IDLE intra-frequency, RRC_IDLE inter-frequency, RRC_CONNECTED intra-frequency, and/or RRC_CONNECTED inter-frequency.

<PSSCH-RSRP>

PSSCH Reference Signal Received Power (PSSCH-RSRP) may be defined as the linear average over the power contributions (in [W]) of the resource elements that carry demodulation reference signals associated with PSSCH, within the PRBs indicated by the associated PSCCH.

Herein, the reference point for the PSSCH-RSRP may be the antenna connector of the UE.

If receiver diversity is in use by the UE, the reported value may not be lower than the corresponding PSSCH-RSRP of any of the individual diversity branches.

PSSCH-RSRP is applicable for RRC_IDLE intra-frequency, RRC_IDLE inter-frequency, RRC_CONNECTED intra-frequency, and/or RRC_CONNECTED inter-frequency.

Herein, the power per resource element may be determined from the energy received during the useful part of the symbol, excluding the CP.

<CBR>

Channel busy ratio (CBR) measured in subframe n is defined as follows.

For PSSCH, CBR may be the portion of sub-channels in the resource pool whose S-RSSI measured by the UE exceed a (pre-)configured threshold sensed over subframes [n−100, n−1].

For PSCCH, in a pool (pre)configured such that PSCCH may be transmitted with its corresponding PSSCH in non-adjacent resource blocks, CBR may be the portion of the resources of the PSCCH pool whose S-RSSI measured by the UE exceed a (pre-)configured threshold sensed over subframes [n−100, n−1], assuming that the PSCCH pool is composed of resources with a size of two consecutive PRB pairs in the frequency domain.

CBR is applicable for RRC_IDLE intra-frequency, RRC_IDLE inter-frequency, RRC_CONNECTED intra-frequency, and/or RRC_CONNECTED inter-frequency.

Herein, the subframe index may be based on physical subframe index.

<CR>

Channel occupancy ratio (CR) evaluated at subframe n may be defined as follows.

CR may be the total number of sub-channels used for its transmissions in subframes [n−a, n−1] and granted in subframes [n, n+b] divided by the total number of configured sub-channels in the transmission pool over [n−a, n+b].

CR is applicable for RRC_IDLE intra-frequency, RRC_IDLE inter-frequency, RRC_CONNECTED intra-frequency, and/or RRC_CONNECTED inter-frequency.

Herein, a may be a positive integer and b may be 0 or a positive integer. a and b may be determined by UE implementation with a+b+1=1000, a >=500, and n+b should not exceed the last transmission opportunity of the grant for the current transmission.

Herein, CR may be evaluated for each (re)transmission.

Herein, in evaluating CR, the UE may assume the transmission parameter used at subframe n is reused according to the existing grant(s) in subframes [n+1, n+b] without packet dropping.

Herein, the subframe index may be based on physical subframe index.

Herein, CR can be computed per priority level.

Hereinafter, sidelink channel scrambling and a sidelink demodulation reference signal will be described.

<Sidelink Channel Scrambling>

A PSSCH scrambling sequence generator may be initialized by $c_{init}=n_{ID}^{x} \cdot 2^{14}+n_{ssf}^{PSSCH} \cdot 2^9+510$ at the start position of each PSSCH subframe. Here, $n_{ssf}^{PSSCH}$ denotes the number of a (current) sidelink subframe in a subframe pool for a PSSCH.

Here, in sidelink transmission modes 3 and 4, $n_{ID}^{x}$ is obtained by $\Sigma_{i=0}^{L-1} p_i \cdot 2^{L-1-i}$ and corresponds to a CRC on a PSCCH transmitted via the same subframe as for a PSCCH, which is expressed as a decimal number. In the above equation, p denotes a parity bit in CRC generation, and L denotes the number of parity bits. A parity bit may be generated by one of the following cyclic generator equations.

$$g_{CRC24A}(D)=[D^{24}+D^{23}+D^{18}+D^{17}+D^{14}+D^{11}+D^{10}+D^7+D^6+D^5+D^4+D^3+D+1]$$

$$g_{CRC24B}(D)=[D^{24}+D^{23}+D^6+D^5+D+1] \text{ for a CRC length } L=24$$

$$g_{CRC16}(D)=[D^{16}+D^{12}+D^5+1] \text{ for a CRC length } L=16$$

$$g_{CRC8}(D)=[D^8+D^7+D^4+D^3+D+1] \text{ for a CRC length of } L=8$$

<Demodulation Reference Signal (DMRS) in Sidelink>

A DM-RS sequence associated with a PSSCH, a PSCCH, and a PSBCH may be generated as follows.

$$r_{PUSCH}^{(\lambda)}(m \cdot M_{sc}^{RS}+n)=w^{(\lambda)}(m) r_{u,v}^{(\alpha_\lambda,\delta)}(n) \quad \text{[Equation 1]}$$

Here, m is 0 for a special subframe and is 0 or 1 for other subframes; $n=0, \ldots, M_{sc}^{RS}-1$; $M_{sc}^{RS}$ is the length of a reference signal which is expressed as the number of subcarriers; δ is 0 or 1; u is a sequence group number in slot $n_s$; v is a basic sequence number; and u may be determined on the basis of $n_{ID}^{RS}$ and $f_{ss}$.

$\alpha_\lambda$ is a cyclic shift value in slot $n_s$ and may be represented by the following equation.

$$\alpha_\lambda = 2\pi n_{cs,\lambda}/12 \quad \text{[Equation 2]}$$

The parameters in Equations 1 and 2 may be determined as illustrated in the following table for a reference signal (DM-RS) for a PSSCH.

TABLE 1

| Parameter | | PSSCH Sidelink transmission modes 3 and 4 | |
|---|---|---|---|
| Group hopping | | enabled | |
| | $n_{ID}^{RS}$ | $n_{ID}^{X}$ | |
| | $n_s$ | First DM-RS symbol of $2n_{ss}^{PSSCH}$ slot Second DM-RS symbol of $2n_{ss}^{PSSCH}+1$ slot | |
| | $f_{ss}$ | $\lfloor n_{ID}^{X}/16 \rfloor \mod 30$ | |

TABLE 1-continued

| Parameter | | PSSCH Sidelink transmission modes 3 and 4 |
|---|---|---|
| Sequence hopping | | disabled |
| Cyclic shift | $n_{cs,\lambda}$ | $\lfloor n_{ID}^{X}/2 \rfloor \mod 8$ |
| Orthogonal sequence | $[w^\lambda(.)]$ | [+1 +1 +1 +1] if $n_{ID}^{X} \mod 2 = 0$ [+1 -1 +1 -1] if $n_{ID}^{X} \mod 2 = 1$ |
| Length of reference signal | $M_{sc}^{RS}$ | $M_{sc}^{PSSCH}$ |
| Number of layers | v | 1 |
| Number of antenna ports | P | 1 |

$n_{ID}^{RS}$ is an ID associated with sequence group hopping. $n_s$ denotes a slot number, and $f_{ss}$ denotes a sequence shift pattern.

$n_{cs,\lambda}$ is a cyclic shift value. In sidelink transmission modes 3 and 4, for a PSSCH and a PSCCH, a symbol mapped to a DM-RS may be l=2, 5 (i.e., third and sixth symbols) in a first slot and may be l=1, 4 (i.e., second and fifth symbols) in a second slot.

In sidelink transmission modes 3 and 4, for a PSBCH, a symbol mapped to a DM-RS may be l=4, 6 (i.e., fifth and seventh symbols) in the first slot and may be l=2 (i.e., the third symbol) in the second slot.

In sidelink transmission modes 3 and 4, a pseudo-random sequence generator may be initialized at the start of each slot satisfying $n_{ss}^{PSSCH} \mod 2=0$. $n_{ss}^{PSSCH}$ denotes the number of a (current) sidelink slot in a subframe pool for a PSSCH.

In sidelink transmission modes 3 and 4, for a PSCCH, a cyclic shift $n_{cs,\lambda}$ to be applied to all DM-RSs in a subframe may be randomly selected from among {0, 3, 6, 9}.

In sidelink transmission modes 3 and 4, m=0, 1, 2, 3 for a PSSCH, and m=0, 1, 2 for a PSBCH.

In sidelink transmission modes 3 and 4, $n_{ID}^{X}$ corresponds to a CRC on a PSCCH transmitted via the same subframe as for a PSCCH, which is expressed as a decimal number, and may be represented as follows.

$$n_{ID}^{X}=\Sigma_{i=0}^{L-1} p_i \cdot 2^{L-1-i} \quad \text{[Equation 3]}$$

Here, p denotes a parity bit, and L denotes the number of parity bits.

$M_{sc}^{PSSCH}$ is a band scheduled for PSSCH transmission which is expressed as the number of subcarriers.

The parameters in Equations 1 and 2 may be determined as illustrated in the following table for a reference signal for a PSCCH.

TABLE 2

| Parameter | | PSCCH Sidelink transmission modes 3 and 4 |
|---|---|---|
| Group hopping | | disabled |
| | $n_{ID}^{RS}$ | — |
| | $n_s$ | — |
| | $f_{ss}$ | 8 |
| Sequence hopping | | disabled |
| Cyclic shift | $n_{cs,\lambda}$ | {0, 3, 6, 9} |
| Orthogonal sequence | $[w^\lambda(.)]$ | [+1 +1 +1 +1] |
| Length of reference signal | $M_{sc}^{RS}$ | $M_{sc}^{PSCCH}$ |
| Number of layers | v | 1 |
| Number of antenna ports | P | 1 |

The parameters in Equations 1 and 2 may be determined as illustrated in the following table for a reference signal for a PSBCH. $N_{ID}^{SL}$ is a sidelink synchronization identity.

TABLE 3

| Parameter | | PSBCH Sidelink transmission modes 3 and 4 |
|---|---|---|
| Group hopping | | disabled |
| | $f_{ss}$ | $\lfloor N_{ID}^{SL}/16 \rfloor \bmod 30$ |
| Sequence hopping | | disabled |
| Cyclic shift | $n_{cs, \lambda}$ | $\lfloor N_{ID}^{SL}/2 \rfloor \bmod 8$ |
| Orthogonal sequence | $[\ldots w^{\lambda}(m) \ldots]$ | $[+1\ +1\ +1]$ if $N_{ID}^{SL} \bmod 2 = 0$ |
| | | $[+1\ -1\ +1]$ if $N_{ID}^{SL} \bmod 2 = 1$ |
| Length of reference signal | $M_{sc}^{RS}$ | $M_{sc}^{PSBCH}$ |
| Number of layers | v | 1 |
| Number of antenna ports | P | 1 |

Hereinafter, a TTI in a future wireless communication system will be described in detail.

In a future wireless communication system, a variable TTI (channel/signal) may be introduced in consideration of traffic (or data) according to various requirements for transmission coverage/reliability/latency. For example, after a basic resource unit is defined (set) in advance, a TTI (for channel/signal transmission associated with data according to a specific requirement) may be defined as a single basic resource unit or a combination of a plurality of basic resource units. An example of each TTI will be described with reference to a drawing.

Figure 9:
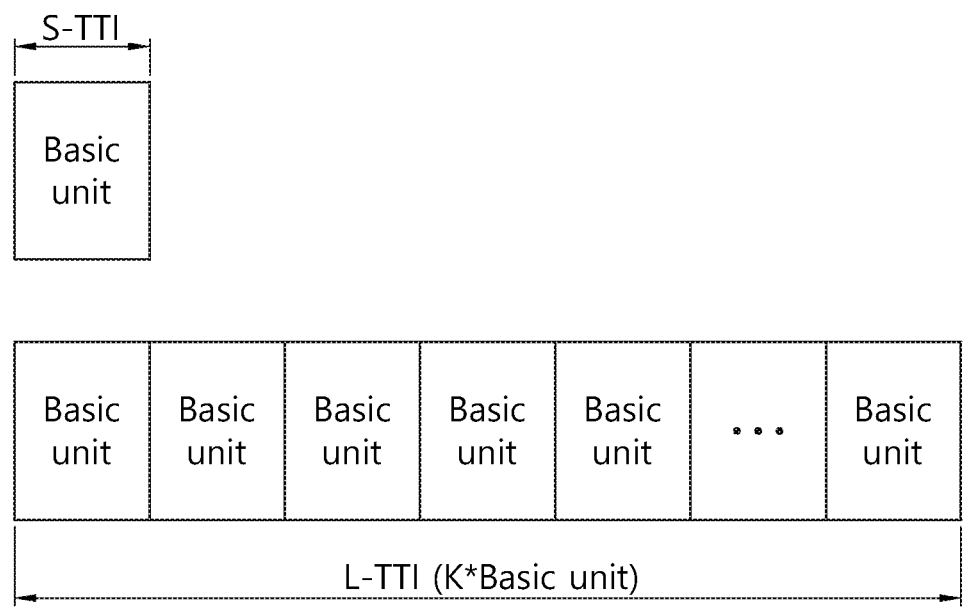
FIG. 9 schematically illustrates an example of an S-TTI and an L-TTI.

FIG. 9 schematically illustrates an example of an S-TTI and an L-TTI.

According to FIG. 9, when an S-TTI is defined as a preset (signaled) basic resource unit, an L-TTI may be construed as a combination of K (preset/signaled)S-TTIs (basic resource units).

Figure 10:
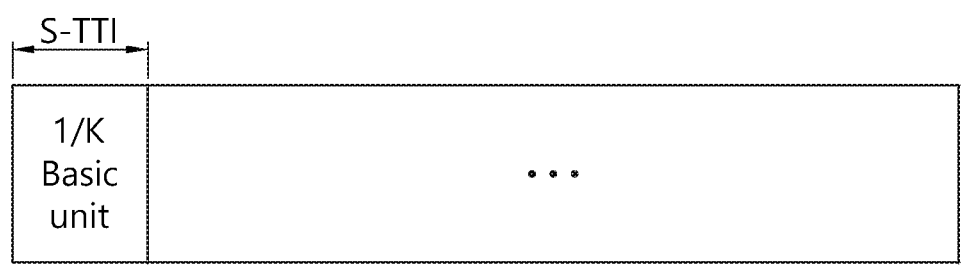
FIG. 10 schematically illustrates another example of an S-TTI and an L-TTI.
Figure 10:
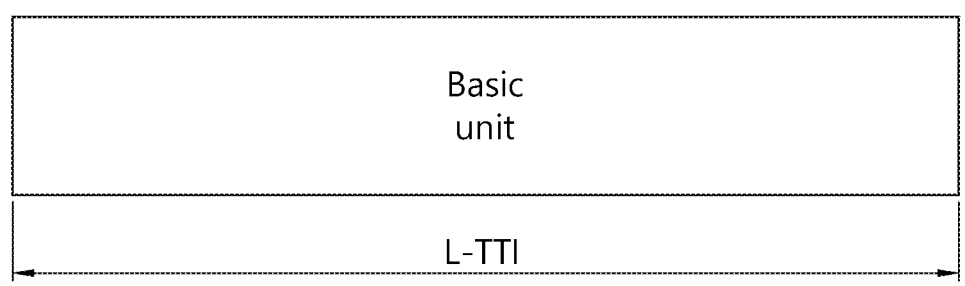

FIG. 10 schematically illustrates another example of an S-TTI and an L-TTI.

According to FIG. 10, when an L-TTI is defined as a preset (signaled) basic resource unit, an S-TTI may be construed as one (e.g., a mini-basic resource unit) of (preset/signaled) K segments into which the L-TTI (basic resource unit) is divided.

Unlike the example illustrated in FIG. 10, an S-TTI may also be a combination of a plurality of (preset (signaled)) basic resource units.

Figure 11:
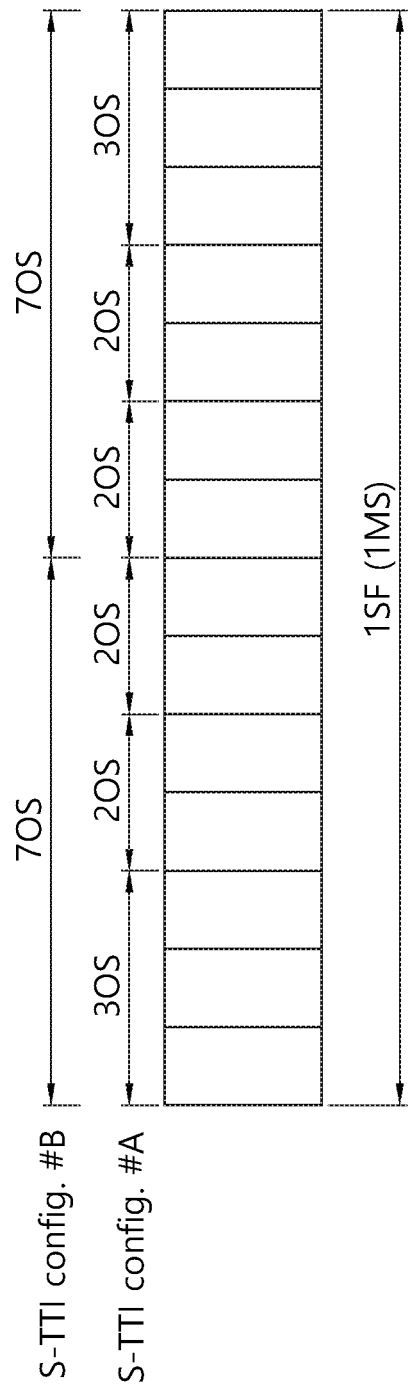
FIG. 11 schematically illustrates still another example of an S-TTI and an L-TTI.

FIG. 11 schematically illustrates still another example of an S-TTI and an L-TTI.

Referring to FIG. 11, for example, in S-TTI configuration # A, a first S-TTI may have a length of three OFDM symbols (OS), a second S-TTI may have a length of two OFDM symbols, a third S-TTI may have a length of two OFDM symbols, a fourth S-TTI may have a length of two OFDM symbols, a fifth S-TTI may have a length of two OFDM symbols, and a sixth S-TTI may have a length of three OFDM symbols.

Alternatively, in S-TTI configuration # B, a first S-TTI may have a length of seven OFDM symbols, and a second S-TTI may have a length of seven OFDM symbols.

Various examples of the relationship between an S-TTI and an L-TTI have been illustrated. However, the foregoing examples of S-TTIs and L-TTIs are illustrated merely for convenience of description, and S-TTI and L-TTI types are not limited to the foregoing examples.

Hereinafter, meanings of abbreviations used herein are explained.

L-TTI: May indicate a legacy subframe (legacy SF) having a length of 1 ms.

S-TTI: May indicate a TTI relatively shorter than 1 ms.

S-PSCCH_L: May indicate the number of symbols included in a PSCCH based on an S-TTI.

S-PSSCH_L: May indicate the number of symbols included in a PSSCH based on an S-TTI.

S-PSCCH, S-PSSCH: May indicate a PSCCH and a PSSCH based on an S-TTI.

L-PSCCH, L-PSSCH: May indicate a legacy PSCCH and a legacy PSSCH based on an existing 1-ms TTI (L-TTI) (or a TTI relatively longer than an S-TTI).

L-N_SS: An L-SLOT index (e.g., $n_{ss}^{PSSCH}$) used for DM-RS sequence generation/sequence (group) hopping on a legacy slot (L-SLOT) in transmission based on an L-TTI (or a TTI relatively longer than an S-TTI).

L-N_SSF: An L-TTI index (e.g., $n_{ssf}^{PSSCH}$) used for scrambling on an L-TTI in transmission based on an L-TTI.

S-N_SS: An index used for DM-RS sequence generation/hopping on an S-TTI in transmission based on an S-TTI.

S-N_SSF: An index used for scrambling on an S-TTI in transmission based on an S-TTI.

S-CBR: A CBR measurement in S-TTI-based transmission.

S-CR: A CR measurement in S-TTI-based transmission.

In the present specification, regarding the abbreviations, an L-TTI is described as a legacy subframe having a length of 1 ms, but the disclosure should not be limited thereto. That is, in a next-generation V2X communication system, the length of a TTI may correspond to the number of contiguous symbols in one transmission direction in the time domain and may be set differently using different numbers of symbols. In this case, when an S-TTI is defined as a basic resource unit set or signaled in advance, an L-TTI may be construed as a set of a plurality of (e.g., K)S-TTIs. In addition, when an L-TTI is defined as a basic resource unit set or signaled in advance, an S-TTI may be construed as one of a plurality of (e.g., K) segments into which the L-TTI is divided.

Hereinafter, the disclosure will be described in detail.

As described above, in a next-generation V2X communication system, a V2X communication method based on a short TTI (S-TTI or s-TTI), which is short than 1 millisecond (ms), is taken into consideration. Here, since an S-TTI may include a smaller number of symbols than an existing TTI, when V2X communication based on an S-TTI is performed, a problem may arise in a PSCCH interpretation method, field configuration, payload size setting, and the like based on an existing TTI. Therefore, the disclosure proposes a V2X communication method based on efficient control and interpretation of a PSSCH in response to the introduction of an S-TTI.

For example, proposed below are efficient PSCCH payload size/field configuration/interpretation methods in the case where V2X communication based on a relatively short transmission time interval (S-TTI) (as compared to an existing interval, e.g., 1 ms) is performed. V2X communication modes may (typically) be divided into, for example, (A) a mode in which a base station signals(/controls) scheduling information associated with V2X message transmission(/reception) (in a V2X resource pool configured(/signaled) in advance (by the base station(/network))) (MODE #3) (e.g., which is mainly for a UE that is located in the communication coverage of the base station (and/or is in an RRC_CONNECTED state)) and/or (B) a mode in which a UE (autonomously) determines(/controls) scheduling information associated with V2X message transmission(/reception) (in a V2X resource pool configured(/signaled) in advance (by a base station(/network))) (MODE #4) (e.g., which is mainly for a UE that is located inside/outside the communication coverage of the base station (and/or is in an RRC_CONNECTED/IDLE state)). In the present disclosure, the wording "sensing operation" may be interpreted as a PSSCH-RSRP measurement operation based on a PSSCH DM-RS sequence (scheduled by a successfully decoded PSCCH) and/or an S-RSSI measurement operation (based on a V2X resource pool-related subchannel) (see Table 3.1). Further, the wording "reception" may be interpreted as (extend to) (at least) one of (A) a V2X channel(/signal) (e.g., PSCCH, PSSCH, PSBCH, PSSS/SSSS, or the like) decoding(/reception) operation (and/or a WAN DL channel(/signal) (e.g., PDCCH, PDSCH, PSS/SSS, or the like) decoding (/reception) operation) and/or (B) a sensing operation and/or (C) a CBR measurement operation. The wording "transmission" may be interpreted as (extend to) a V2X channel(/signal) (e.g., PSCCH, PSSCH, PSBCH, PSSS/SSSS, or the like) transmission operation (and/or a WAN UL channel(/signal) (e.g., PUSCH, PUCCH, SRS, or the like) transmission operation). The wording "carrier" may be interpreted as (extend to) (A) a carrier set(/group) configured(/signaled) in advance and/or (B) a V2X resource pool. The wording "RS" may be (at least) interpreted as a DM-RS. The wording "scrambling" may be (at least) interpreted as PSSCH(/PSCCH) scrambling. Also, herein, each of the definitions of S-RSSI, PSSCH-RSRP, CBR, and CR is as same as describe above.

In addition, an S-RSSI, PSSCH RSRP, a CBR, and a CR are defined as described above.

Figure 12:
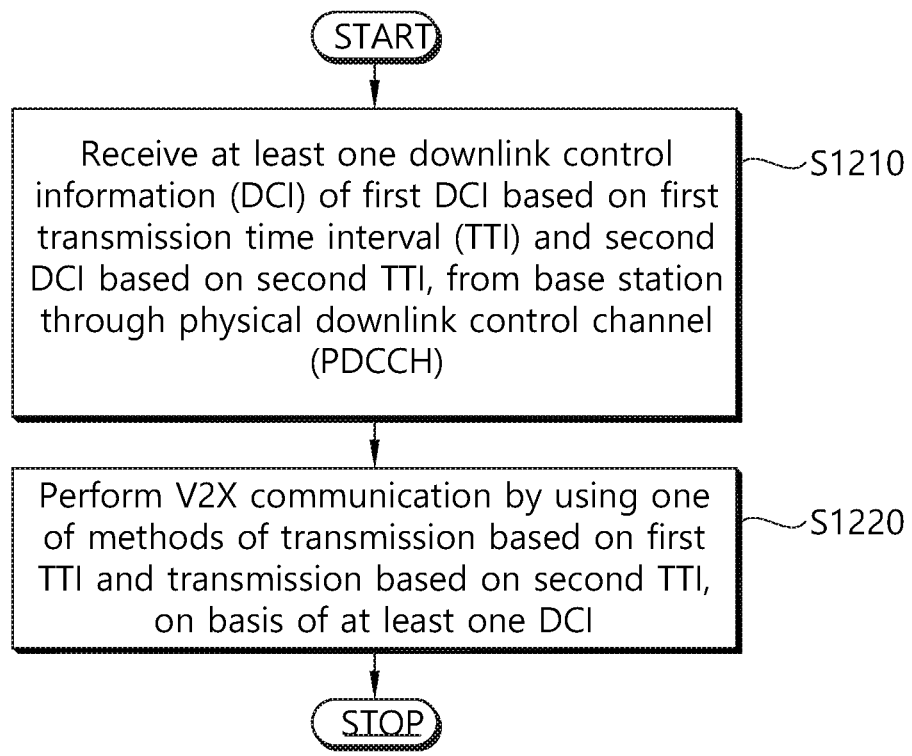
FIG. 12 is a flowchart illustrating a V2X communication method of a UE according to an embodiment of the disclosure.

FIG. 12 is a flowchart illustrating a V2X communication method of a UE according to an embodiment of the disclosure.

Referring to FIG. 12, a UE receives at least one piece of first DCI based on a first TTI and second DCI based on a second TTI from a base station through a PDCCH (S1210). The first TTI may be shorter than the second TTI. A first radio network temporary identifier (RNTI) set for the first DCI may be different from a second RNTI set for the second DCI. It may be determined which of transmission based on the first TTI and transmission based on the second TTI is allowed on the basis of one of the first RNTI and the second RNTI.

The UE performs V2X communication using one method of the transmission based on the first TTI and the transmission based on the second TTI on the basis of the at least one piece of DCI (S1220).

Each of the first DCI and the second DCI may be DCI for dynamic scheduling or semi-persistent scheduling.

The size of the first DCI may be the same as the size of the second DCI.

A flag for distinguishing the first DCI and the second DCI may be included in the first DCI.

When the first DCI is received, determination of time to perform initial transmission or a sidelink index field may be interpreted on the basis of the second TTI.

User equipment assistance information about the transmission based on the first TTI may be independently reported.

When performing the V2X communication, scheduling for the V2X communication based on the first TTI may be performed by each subchannel group, and the subchannel group may be a set of a predefined number of subchannels included in a V2X resource pool.

The scheduling may be performed when the field configuration of a PSCCH based on the first TTI and the number of resource blocks included in the PSCCH based on the first TTI are set to be the same those of a PSCCH based on the second TTI.

When both the transmission based on the first TTI and the transmission based on the second TTI are allowed in the V2X resource pool, a PSSCH based on the first TTI may include a field indicating the transmission based on the first TTI.

When performing the V2X communication, a field indicating a time interval between initial transmission and retransmission of the PSCCH may be interpreted on the basis of the second TTI.

When only the transmission based on the first TTI is allowed in the V2X resource pool, if performing the V2X communication, the field indicating the time interval between the initial transmission and the retransmission of the PSCCH may be interpreted on the basis of the first TTI.

The first DCI may include a field indicating a transmission period allowed in the V2X pool and the number of aggregated first TTIs capable of the transmission based on the first TTI.

When performing the V2X communication, resource exclusion may be performed on the basis of the field indicating the transmission period allowed in the V2X pool and the number of aggregated first TTIs capable of the transmission based on the first TTI.

When the size of the PSCCH based on the first TTI is greater than the size of the PSSCH based on the first TTI, the PSCCH based on the first TTI may include an indicator indicating the index of a first TTI used for transmitting the PSSCH among a plurality of first TTIs corresponding to a PSCCH transmission interval.

An allowable range of the transmission based on the first TTI may be set differently for each congestion level.

Hereinafter, the foregoing V2X communication method of the UE will be described in detail with reference to embodiments.

[Proposed Method]

Hereinafter, a method for reducing a payload size when transmitting an S-PSCCH including a relatively smaller number of symbols than an L-PSCCH (e.g., in the case where a Rel-14 UE cannot decode an S-PSCCH) is proposed.

(Rule # A) When an L-PSCCH field configuration and the number of RBs (2 RBs) conventionally used are reused for an S-PSCCH (here, the number of symbols is different) and S-TTI transmission coexists in an Rel-14 resource pool (L-TTI), subchannels included in the Rel-14 resource pool (L-TTI) are grouped into as many groups as a number defined (signaled) in advance, and then S-TTI-based S-PSSCH transmission is scheduled by subchannel group.

When this rule is applied, the effect of reducing the total number of subchannels included in the resource pool can be obtained, and the size of the "FREQ. RESOURCE LOCATION OF INI-TX & RE-TX" field in the S-PSCCH can be reduced.

In other words, as described above, the size of a resource allocation field (e.g., the frequency resource location field of initial transmission and retransmission) may be determined on the basis of the total number of subchannels included in the V2X resource pool. That is, the number of bits of the resource allocation field may vary depending on the number of subchannels of a sidelink. For example, as the number of subchannels increases, the size of the resource allocation field may also increase.

Here, when S-TTI-based PSCCH transmission is performed, the number of symbols included in a PSCCH may be reduced as compared with existing (e.g., 1-ms TTI) PSCCH transmission. In this case, in order to achieve the same valid coding rate (or performance) as in the existing PSCCH transmission, a method of reducing the payload size of a PSCCH may be considered. Here, according to Rule # A, when PSSCH scheduling is performed by a unit of a subchannel group in which a plurality of subchannels is aggregated rather than a unit of a subchannel, it is possible to obtain the effect of reducing the number of subchannels, thus reducing the size of the resource allocation field determined on the basis of the number of subchannels.

Hereinafter, a mode 3-based sidelink (SL)S-TTI transmission scheduling method (mode 3-based WAN UL S-TTI transmission is construed as not being included in phase 2 WID) is proposed.

(Rule # B-1) Different RNTI values may be set for a DCI format (dynamic/SPS S-DCI) used for MODE-3 S-TTI transmission and for an existing DCI format (dynamic/SPS L-DCI) used for MODE-3 L-TTI transmission.

For example, when Rule # A (i.e., S-PSSCH transmission by subchannel group) is applied to S-DCI and thus the S-DCI size is smaller than the L-DCI size, the dynamic S-DCI size may be set to "MAX {DCI 0, SPS S-DCI, DYNAMIC L-DCI, SPS L-DCI}" and the SPS S-DCI size is set to "MAX {DCI 0, DYNAMIC L-DCI, SPS L-DCI}". That is, the size of DYNAMIC S-DCI may be set to a value having the largest value among DCI 0, SPS S-DCI, DYNAMIC L-DCI, and SPS L-DCI, and the size of SPS S-DCI may be set to a value having the largest value among DCI 0, DYNAMIC L-DCI, and SPS L-DCI.
That is, the size of dynamic S-DCI may be set to one having the largest value among DCI 0, SPS S-DCI, dynamic L-DCI, and SPS L-DCI, and the size of SPS S-DCI may be set to one having the largest value among DCI 0, dynamic L-DCI, and SPS L-DCI.

Herein, exceptionally, the size of the "LOWEST INDEX OF SUB-CHANNEL ALLOCATION TO INI-TX" field may be set to be unchanged (i.e., is not subjected to Rule # A).

In other words, in mode 3 in which a UE to perform V2X communication receives DCI from a network and has resource scheduling, an RNTI set for a DCI format used for S-TTI transmission scheduling and an RNTI set for a DCI format used for L-TTI transmission scheduling may be set to have different values. That is, the UE may identify whether the DCI received by the UE is DCI for S-TTI transmission scheduling or DCI for L-TTI transmission scheduling through an RNTI set in a DCI format in a decoding process. Here, the payload size of DCI used for S-TTI transmission scheduling and the payload size of DCI used for L-TTI transmission scheduling may be set to be the same, thus reducing the number of times the UE performs blind decoding in a V2X resource pool in which S-TTI-based transmission and L-TTI-based transmission coexist.

In addition, zero padding may be used to match the payload size of the DCI used for L-TTI transmission scheduling and the payload size of the DCI used for S-TTI transmission scheduling.

(Rule # B-2) When S-DCI and L-DCI are decoded with the same RNTI, a flag (e.g., 1 bit) for distinguishing these two pieces of DCI is defined in the S-DCI.

Herein, exceptionally, when S-DCI and L-DCI are decoded with the same RNTI, it is possible to distinguish these two pieces of DCI without defining an additional flag by linking an "SL SPS CONFIGURATION INDEX" with S-TTI transmission in advance.

(Rule # B-3) Since S-DCI is signaled through an L-TTI PDCCH, after receiving the S-DCI, determination of the time to perform initial transmission or interpretation of the "SL INDEX (TDD SHARED CARRIER)" field is performed by a unit of an L-TTI.

(Rule # B-4) (Some) UE ASSISTANCE information for an S-TTI is reported separately (from an L-TTI) (e.g., observed traffic pattern-related message size/estimated period/timing offset/PPPP, and the like).

In other words, when the UE transmits UE assistance information for mode-3 scheduling to the base station, the UE may separately transmit UE assistance information for an S-TTI and UE assistance information for an L-TTI.

Hereinafter, a method of differently interpreting an S-PSCCH field depending on whether S-TTI-based transmission and L-TTI-based transmission coexist in a resource pool is proposed.

(Rule # C-1) When S-TTI/L-TTI-based transmissions coexist(/are allowed) in a particular resource pool, particularly, when an S-PSCCH field configuration/the numbers of symbols & RBs are set to be the same as those for an L-PSCCH so that a L-TTI-based UE can decode an S-PSCCH (for sensing S-TTI TX) (here, a field indicating an S-TTI-based transmission type is needed (at least) in the S-PSSCH (e.g., using a reserved bit)), an S-TTI-based UE interprets the S-PSCCH field equally as the Rel-14 UE (L-TTI).

For example, the value of the "TIME GAP BETWEEN INI-TX & RE-TX" field is counted on the basis of an L-TTI.

Also, for example, Rule # A for reducing the S-PSCCH payload size is not applied (i.e., the size of the "FREQ. RESOURCE LOCATION OF INI-TX & RE-TX" field is the same as that in the L-TTI).

(Rule # C-2) When only S-TTI-based transmission is allowed in a particular resource pool, even though an S-PSCCH field configuration(/the number of RBs) is set to be the same as that for an L-PSCCH, if an S-TTI-based UE has relatively high processing capability, (some of) the following fields may be interpreted differently (from the aspect of the S-TTI UE).

For example, the value of the "TIME GAP BETWEEN INI-TX & RE-TX" field is counted on the basis of an S-TTI.

Also, for example, Rule # A for reducing the S-PSCCH payload size is applied (i.e., the size of the "FREQ. RESOURCE LOCATION OF INI-TX & RE-TX" field is reduced as compared with that in the L-TTI).

In other words, in a resource pool in which S-TTI-based transmission and L-TTI-based transmission coexist, both S-TTI-based transmission and L-TTI-based transmission are supported for PSCCH transmission and PSSCH transmission. That is, for example, PSCCH transmission may be performed on the basis of an L-TTI, and PSSCH transmission may be performed on the basis of an S-TTI. Here, a transmitting UE may report information about a PSSCH transmission format and the type of a TTI used for the transmission through a particular field of a PSCCH so that a receiving terminal can identify the format and the TTI used for performing the PSSCH transmission. Here, the transmitting UE may also report the information through reversed bits. Alternatively, the receiving UE may consider that the PSSCH format and the type of the TTI are the same as a PSCCH format and a TTI type for scheduling the same.

When transmitting an S-TTI-based PSCCH using a field configuration and the number of RBs which are the same as those for an L-TTI-based PSCCH in the resource pool in which the S-TTI-based transmission and the L-TTI-based transmission coexist, the value indicating a field of a time interval between initial transmission and retransmissions may be interpreted in L-TTIs.

However, when transmitting an S-TTI-based PSCCH using a field configuration and the number of RBs which are the same as those for an L-TTI-based PSCCH in a V2X resource pool in which only S-TTI-based transmission is allowed, the value of a field indicating a time interval between initial transmission and retransmission may be interpreted in S-TTIs. Using this method makes it possible to improve resource utilization in PSSCH retransmission.

Figure 13:
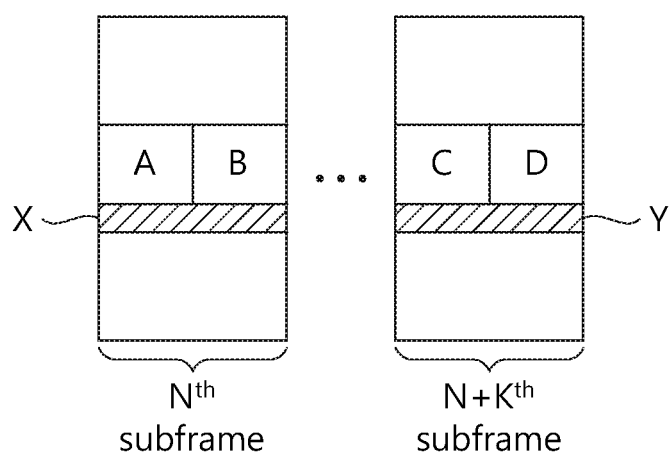
FIG. 13 illustrates a V2X communication method according to Rule # C-1 and Rule # C-2.

FIG. 13 illustrates a V2X communication method according to Rule # C-1 and Rule # C-2.

FIG. 13 illustrates an example in which, in initial transmission via an Nth subframe, a PSCCH is transmitted on the basis of an L-TTI (X in FIG. 13), and a PSSCH is transmitted on the basis of an S-TTI (A in FIG. 13). Here, for convenience of description, an example is illustrated in which the length of the L-TTI is the length of one subframe and the length of the S-TTI is half the length of one subframe.

When retransmission of the transmission via the Nth subframe is performed in an N+Kth subframe, if the value of a field indicating an time interval between the initial transmission and the retransmission is calculated on the basis of the L-TTI according to Rule # C-1, the retransmission of the PSSCH may be performed only via C since the initial transmission of the PSSCH is performed via A.

However, when the value of the field indicating the time interval between the initial transmission and the retransmission is calculated on the basis of the S-TTI, even though the initial transmission of the PSSCH is performed via A, the retransmission of the PSSCH may be performed not only via C but also via D. Thus, more sophisticated resource allocation may be performed.

In the disclosure, the following configuration may also be considered.

To support a dynamic change in the number of symbols included in an S-PSSCH or the number of S-TTIs used for transmitting a PSSCH, a field indicating information about the numbers may be defined in the S-PSCCH/S-DCI.

For example, when a UE fails to monitor an S-PSCCH in a particular S-TTI, the UE is configured to perform a step-2 operation based on (S-)PSSCH-RSRP in consideration a transmission period/the number of aggregated S-TTIs (& the number of symbols included in an S-PSSCH) which are allowed in a corresponding pool.

That is, the UE may exclude resources having a PSSCH RSRP, received on particular resources, being a threshold or greater from selection of resources for V2X communication. Here, when the UE fails to perform sensing or PSCCH monitoring in a particular S-TTI in a V2X resource pool that allows V2X communication based on an S-TTI, the UE may exclude a corresponding resource from selection of a transmission resource in view of a resource transmission period and the number of aggregated S-TTIs allowing transmission based on a plurality of S-TTIs which are allowed in the pool.

Figure 14:
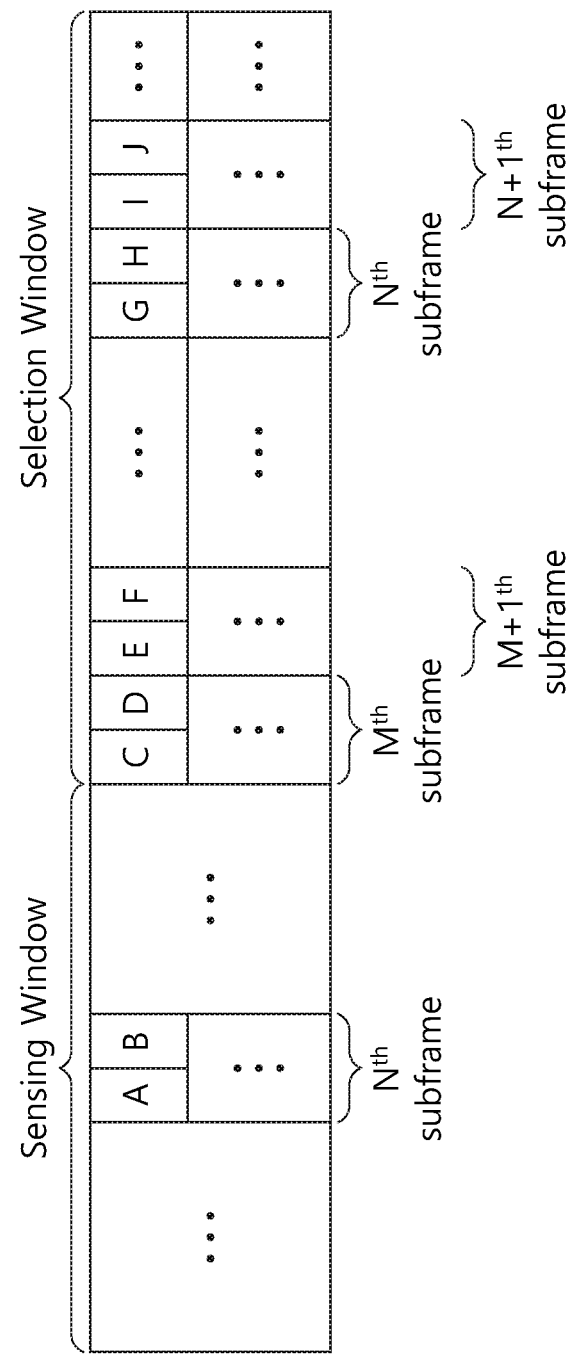
FIG. 14 illustrates a method of excluding a resource in a V2X resource pool for V2X communication according to an embodiment of the disclosure.

FIG. 14 illustrates a method of excluding a resource in a V2X resource pool for V2X communication according to an embodiment of the disclosure.

FIG. 14 illustrates an interval (i.e., a sensing window) in which a UE performs sensing in a V2X resource pool and an interval (i.e., a selection window) in which the UE selects a resource for performing V2X communication on the basis of the sensing. For convenience of description, FIG. 14 illustrates an example in which the length of an S-TTI is half the length of one subframe.

Here, the UE may perform V2X communication by selecting a resource in the selection window on the basis of sensing in the sensing window.

For example, when S-TTI-based transmission is allowed in the V2X resource pool and the UE does not monitor or sense an S-TTI corresponding to A, if S-TTIs corresponding to a transmission period allowed in the resource pool are C and G and the number of aggregated S-TTIs allowing S-TTI-based communication is 3, the UE may maximally exclude resources corresponding to C, D, and E and resources corresponding to G, H, and I from resource selection.

Also, for example, when the S-PSCCH length (e.g., two S-TTIs) is longer than the S-PSSCH length (e.g., one S-TTI) in a PSCCH/PSSCH FDM environment, the S-PSCCH may require an indicator indicating which S-TTI is used for S-PSSCH transmission among a plurality of S-TTIs included in an S-PSCCH transmission interval.

That is, for example, when the length of a PSSCH is the length of one S-TTI and the length of a PSCCH is the length of two S-TTIs, an indicator indicating which of a first S-TTI and a second S-TTI a PSSCH transmission interval corresponds to may be included in the PSCCH.

Also, an allowable TTI length range may be set(/signaled) differently for each congestion level (e.g., CBR).

It is obvious that examples of the proposed methods described above may also be included as methods for implementing the disclosure and may thus be considered as a kind of proposed methods. In addition, the foregoing proposed methods may be independently implemented, or some proposed methods may be implemented in combination (or by merging).

For example, although the disclosure illustrates the proposed methods on the basis of a 3GPP LTE system for convenience of description, the scope of the system to which the proposed methods are applied can be extended to systems other than the 3GPP LTE system.

Specifically, the proposed methods of the disclosure can be extended and applied to D2D communication. D2D communication means that a UE communicates directly with another UE using a wireless channel Here, the UE refers to, for example, a terminal of a user, but a network device, such as a base station, which transmits and receives a signal according to a communication mode between UEs, may be considered as a UE. Further, the proposed methods of the disclosure may be restrictively applied only to a mode-3 V2X operation (and/or a mode-4 V2X operation). In addition, the proposed methods of the disclosure may be restrictively applied only to (particular) V3X channel (signal) transmission (e.g., PSSCH (and/or (interworking) PSCCH and/or PSBCH) transmission) set (signaled) in advance. Furthermore, the proposed methods of the disclosure may be restrictively applied only when a PSSCH and a (interworking) PSCCH are transmitted adjacently (and/or non-adjacently) (in a frequency domain) (and/or when transmission based on an MCS (and/or a coding rate and/or an RB value (range)) set (signaled) in advance is performed). The proposed methods of the disclosure may also be restrictively applied only to a mode-3 (and/or mode-4) V2X carrier (and/or (mode-4 (3)) SL (UL) SPS (and/or SL (UL) dynamic scheduling) carrier). Moreover, the proposed methods of the disclosure may be (restrictively) applied only when synchronization signals (transmission (and/or reception)) resource locations and/or numbers thereof (and/or V2X resource pool-related subframe locations and/or numbers thereof (and/or subchannel sizes and/or subchannel numbers)) are the same (and/or (partially) different) for carriers.

Figure 15:
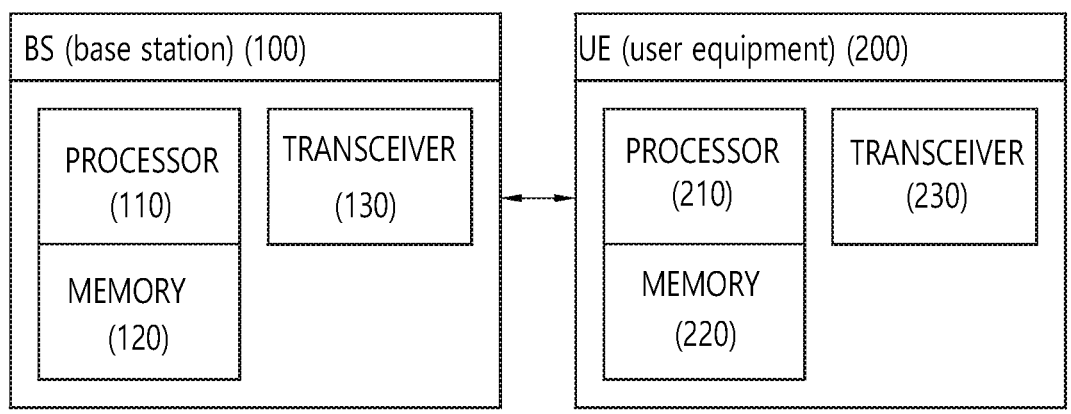
FIG. 15 is a block diagram illustrating a communication device in which an embodiment of the present disclosure is implemented.

FIG. 15 is a block diagram illustrating a communication device in which an embodiment of the present disclosure is implemented.

Referring to FIG. 15, a base station 100 includes a processor 110, a memory 120, and a transceiver 130. The processor 110 implements the proposed functions, processes and/or methods. The memory 120 is connected to the processor 110 and stores various information for driving the processor 110. The transceiver 130 is connected to the processor 110 to transmit and/or receive a radio signal.

A user equipment (UE) (200) includes a processor (210), a memory (220), and a transceiver (230). The processor (210) implements proposed functions, processes and/or methods. The memory (220) is connected to the processor (210) and stores various information for driving the processor (210). The transceiver (230) is connected to the processor (210) and transmits and/or receives radio signals. The UE (200) may perform a V2X communication to another UE according to the above-described method.

The processor (110, 210) may include an application-specific integrated circuit (ASIC), a separate chipset, a logic circuit, a data processing unit, and/or a converter inter-converting baseband signals and radio signals. The memory (120, 220) may include a read-only memory (ROM), a random access memory (RAM), a flash memory, a memory card, a storage medium, and/or other equivalent storage devices. The transceiver (130, 230) may include one or more antennas transmitting and/or receiving radio signals. When the embodiment is implemented as software, the above-described methods may be implemented as a module (i.e., process, function, etc.) for performing the above-described functions. The module may be stored in the memory (120, 220) and may be performed by the processor (110, 210). The memory (120, 220) may be located inside or outside the processor (110, 210) and may be coupled to the processor (110, 210) by using various well-known means.

Figure 16:
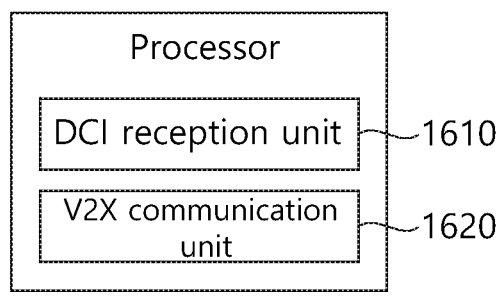
FIG. 16 is a block diagram illustrating an example of a device included in a processor.

FIG. 16 is a block diagram illustrating an example of a device included in a processor.

According to FIG. 16, the processor may functionally include a DCI receiver 1610 and a V2X communication unit 1620. The processor may correspond to the processors 110 and 210 in FIG. 15.

The DCI receiver may have a function of receiving at least one of first DCI based on a first TTI and second DCI based on a second TTI from a base station through a PDCCH. The V2X communication unit may have a function of performing V2X communication by one method of transmission based on the first TTI and transmission based on the second TTI on the basis of the at least one DCI.

The foregoing description of the device included in the processor is made merely for illustration, and the processor may further include other functional elements or devices. Specific examples of operations performed by the respective function devices described above have been described above, and thus a redundant description thereof will be omitted.

What is claimed is:

1. A method for a sidelink of a user equipment (UE) in a wireless communication system, the method comprising:
   establishing a radio resource control (RRC) connection with a base station,
   wherein, after establishing the RRC connection, the UE is in an RRC connected state;
   receiving, from the base station, information for a resource pool of the sidelink;
   performing a measurement of a channel busy ratio (CBR) on the resource pool,
   wherein the CBR is defined as a portion of sub-channels in the resource pool whose sidelink received signal strength indicator (SL RSSI) measured by the UE exceed a threshold sensed over a CBR measurement window,
   wherein the CBR is applicable for at least one of a RRC idle intra frequency, a RRC idle inter frequency, a RRC connected intra frequency, or a RRC connected inter frequency, and
   wherein the SL RSSI is applicable for at least one of the RRC idle intra frequency, the RRC idle inter frequency, the RRC connected intra frequency, or the RRC connected inter frequency;
   receiving at least one piece of downlink control information (DCI) of first DCI based on a first transmission time interval (TTI) and second DCI based on a second TTI from a base station through a physical downlink control channel (PDCCH); and
   performing an operation of the sidelink using one method of transmission based on the first TTI and transmission based on the second TTI on the basis of the at least one piece of DCI,
   wherein the first TTI is shorter than the second TTI,
   a first radio network temporary identifier (RNTI) set for the first DCI is different from a second RNTI set for the second DCI, and
   it is determined which of the transmission based on the first TTI and the transmission based on the second TTI is allowed on the basis of one of the first RNTI and the second RNTI,
   wherein an allowable range of the transmission based on the first TTI is set differently for each CBR, and
   wherein user equipment assistance information for the transmission based on the first TTI is independently reported from user equipment assistance information for the transmission based on the second TTI.

2. The method of claim 1, wherein each of the first DCI and the second DCI is DCI for dynamic scheduling or semi-persistent scheduling.

3. The method of claim 1, wherein a size of the first DCI is the same as a size of the second DCI.

4. The method of claim 1, wherein the first DCI comprises a flag for distinguishing the first DCI and the second DCI.

5. The method of claim 1, wherein when the first DCI is received, determination of a time to perform an initial transmission or a sidelink index field are interpreted on the basis of the second TTI.

6. The method of claim 1, wherein, when performing the operation of the sidelink, scheduling for the operation of the sidelink based on the first TTI is performed by each sub-channel group, and the subchannel group is a set of a predefined number of subchannels comprised in a V2X resource pool.

7. The method of claim 6, wherein the scheduling is performed when a field configuration of a physical sidelink control channel (PSCCH) based on the first TTI and a number of resource blocks comprised in the PSCCH based on the first TTI are set to be the same those of a PSCCH based on the second TTI.

8. The method of claim 1, wherein, when both the transmission based on the first TTI and the transmission based on the second TTI are allowed in a V2X resource pool, a physical sidelink shared channel (PSSCH) based on the first TTI comprises a field indicating the transmission based on the first TTI.

9. The method of claim 8, wherein, when performing the operation of the sidelink, a field indicating a time interval between initial transmission and retransmission of the PSCCH is interpreted on the basis of the second TTI.

10. The method of claim 1, wherein, when only the transmission based on the first TTI is allowed in a V2X resource pool, when performing the operation of the sidelink, a field indicating a time interval between initial transmission and retransmission of a PSCCH is interpreted on the basis of the first TTI.

11. The method of claim 1, wherein the first DCI comprises a field indicating a transmission period allowed in a V2X pool and a number of aggregated first TTIs capable of the transmission based on the first TTI.

12. The method of claim 11, wherein when performing the operation of the sidelink, resource exclusion is performed on the basis of the field indicating the transmission period allowed in the V2X pool and the number of aggregated first TTIs capable of the transmission based on the first TTI.

13. The method of claim 1, wherein, when a size of the PSCCH based on the first TTI is greater than a size of the PSSCH based on the first TTI, a PSCCH based on the first TTI comprises an indicator indicating an index of a first TTI used for transmitting the PSSCH among a plurality of first TTIs corresponding to a PSCCH transmission interval.

14. A user equipment (UE) comprising:
a transceiver configured to transmit and receive a radio signal; and
a processor configured to be connected with the transceiver and to operate,
wherein the processor is configured to:
establish a radio resource control (RRC) connection with a base station,
wherein, after establishing the RRC connection, the UE is in an RRC connected state;
receive, from the base station, information for a resource pool of a sidelink;
perform a measurement of a channel busy ratio (CBR) on the resource pool,
wherein the CBR is defined as a portion of sub-channels in the resource pool whose sidelink received signal strength indicator (SL RSSI) measured by the UE exceed a threshold sensed over a CBR measurement window,
wherein the CBR is applicable for at least one of a RRC idle intra frequency, a RRC idle inter frequency, a RRC connected intra frequency, or a RRC connected inter frequency, and
wherein the SL RSSI is applicable for at least one of the RRC idle intra frequency, the RRC idle inter frequency, the RRC connected intra frequency, or the RRC connected inter frequency;
receive at least one piece of downlink control information (DCI) of first DCI based on a first transmission time interval (TTI) and second DCI based on a second TTI from a base station through a physical downlink control channel (PDCCH); and
perform an operation of the sidelink using one method of transmission based on the first TTI and transmission based on the second TTI on the basis of the at least one piece of DCI,
wherein the first TTI is shorter than the second TTI, a first radio network temporary identifier (RNTI) set for the first DCI is different from a second RNTI set for the second DCI, and it is determined which of the transmission based on the first TTI and the transmission based on the second TTI is allowed on the basis of one of the first RNTI and the second RNTI,
wherein an allowable range of the transmission based on the first TTI is set differently for each CBR, and
wherein user equipment assistance information for the transmission based on the first TTI is independently reported from user equipment assistance information for the transmission based on the second TTI.

* * * * *